United States Patent
Gwon et al.

(10) Patent No.: US 11,507,233 B2
(45) Date of Patent: Nov. 22, 2022

(54) TOUCH DISPLAY DEVICE

(71) Applicant: LG Display Co., Ltd., Seoul (KR)

(72) Inventors: Hyang-Myoung Gwon, Paju-si (KR); Ji-Hyun Jung, Paju-si (KR); Deuk-Su Lee, Paju-si (KR); Su-Chang An, Paju-si (KR); Jae-Gyun Lee, Paju-si (KR); Ru-Da Rhe, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/354,585

(22) Filed: Jun. 22, 2021

(65) Prior Publication Data

US 2022/0187948 A1 Jun. 16, 2022

(30) Foreign Application Priority Data

Dec. 14, 2020 (KR) .................. 10-2020-0174107

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0448* (2019.05); *G06F 2203/04111* (2013.01)

(58) Field of Classification Search
CPC .... G06F 3/0445; G06F 3/0412; G06F 3/0448; G06F 2203/04111
See application file for complete search history.

(56) References Cited

U.S. PATENT DOCUMENTS

| 9,989,797 | B2 | 6/2018 | Kim et al. | |
| 2011/0291982 | A1* | 12/2011 | Hsieh | G06F 3/0443 |
| | | | | 345/173 |
| 2013/0341651 | A1* | 12/2013 | Kim | H01L 27/027 |
| | | | | 257/432 |
| 2015/0077383 | A1* | 3/2015 | Kang | G06F 3/0446 |
| | | | | 345/174 |
| 2017/0059912 | A1* | 3/2017 | Kim | H01L 27/124 |
| 2020/0026393 | A1* | 1/2020 | Gourevitch | G06F 3/04164 |
| 2021/0141488 | A1* | 5/2021 | Mugiraneza | G06F 3/0448 |

FOREIGN PATENT DOCUMENTS

KR 10-2017-0026107 A 3/2017

* cited by examiner

*Primary Examiner* — Amit Chatly
(74) *Attorney, Agent, or Firm* — Fenwick & West LLP

(57) ABSTRACT

A touch display device includes a touch sensor and having a touch area and a non-display area at a side of the touch area. The non-display area include a touch driving part. The touch display device includes: a plurality of driving electrodes in the touch area, the plurality of driving electrodes connected to each other through at least one bridge line to constitute a plurality of row touch driving lines; a plurality of sensing electrodes crossing the plurality of driving electrodes in the touch area; and at least one driving routing line from the at least one bridge line connecting the plurality of driving electrodes, wherein the at least one driving routing line extends from the touch area to the non-display area.

15 Claims, 6 Drawing Sheets

TOUCH DISPLAY DEVICE

CROSS REFERENCE TO RELATED APPLICATIONS

The present application claims the priority benefit of Republic of Korea Patent Application No. 10-2020-0174107 filed in Republic of Korea on Dec. 14, 2020, which is hereby incorporated by reference herein in its entirety.

BACKGROUND

Technical Field

The present disclosure relates to a touch display device, and more particularly, to a touch display device having a narrow bezel.

Discussion of the Related Art

As the information age progresses, display devices have rapidly advanced. A liquid crystal display (LCD) device and an organic light emitting diode (OLED) display device have been developed and widely used as a flat panel display (FPD) having a thin profile, a light weight and a low power consumption.

Recently, a touch display device where a touch panel is disposed on a display panel has been widely used.

The touch display device referred to as a touch screen is used as an output device displaying an image and as an input device receiving an order of a user by a touch on a portion of the image. When the user watches the image of the display panel and touches the touch panel, the touch panel detects a position information of the touched portion and recognizes an order of the user by comparing the detected position information with a position information of the image.

The touch panel of the touch display device may be classified into a resistive type, a capacitive type, an infrared type and a surface acoustic wave type according to a method of detecting a position information.

The capacitive type touch panel has been widely used due to an excellent durability, a long lifetime, an easy support for multi-touch and a high light transmittance.

The capacitive type touch panel may be classified into a mutual capacitance type where a transmitting line and a receiving line are independently formed and a change of a capacitance between the transmitting line and the receiving line according to a touch is detected and a self-capacitance type where a voltage is applied to a touch electrode independent in a region and a change of capacitance of the touch electrode according to touch is detected.

In the touch panel, since driving electrodes and sensing electrodes are formed on the same layer, a touch area requires a routing area where a routing line is formed for connecting the sensing electrodes or the driving electrodes. The touch area is reduced and a touch accuracy is deteriorated due to the routing area.

As a result, the routing area is disposed in a non-display area of the touch panel. However, since the routing area of the non-display area functions as a bezel of the touch panel, a research for a touch panel having a narrow bezel is required.

SUMMARY

Accordingly, the present disclosure is directed to a touch display device that substantially obviates one or more of the problems due to limitations and disadvantages of the related art.

An object of the present disclosure is to provide a touch display device having a narrow bezel by eliminating a routing area in a touch panel.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch display device includes a touch sensor and having a touch area and a non-display area at a side of the touch area. The non-display area includes a touch driving part. The touch display device includes: a plurality of driving electrodes in the touch area, the plurality of driving electrodes connected to each other through at least one bridge line to constitute a plurality of row touch driving lines; a plurality of sensing electrodes crossing the plurality of driving electrodes in the touch area; and at least one driving routing line from the at least one bridge line connecting the plurality of driving electrodes, wherein the at least one driving routing line extends from the touch area to the non-display area.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
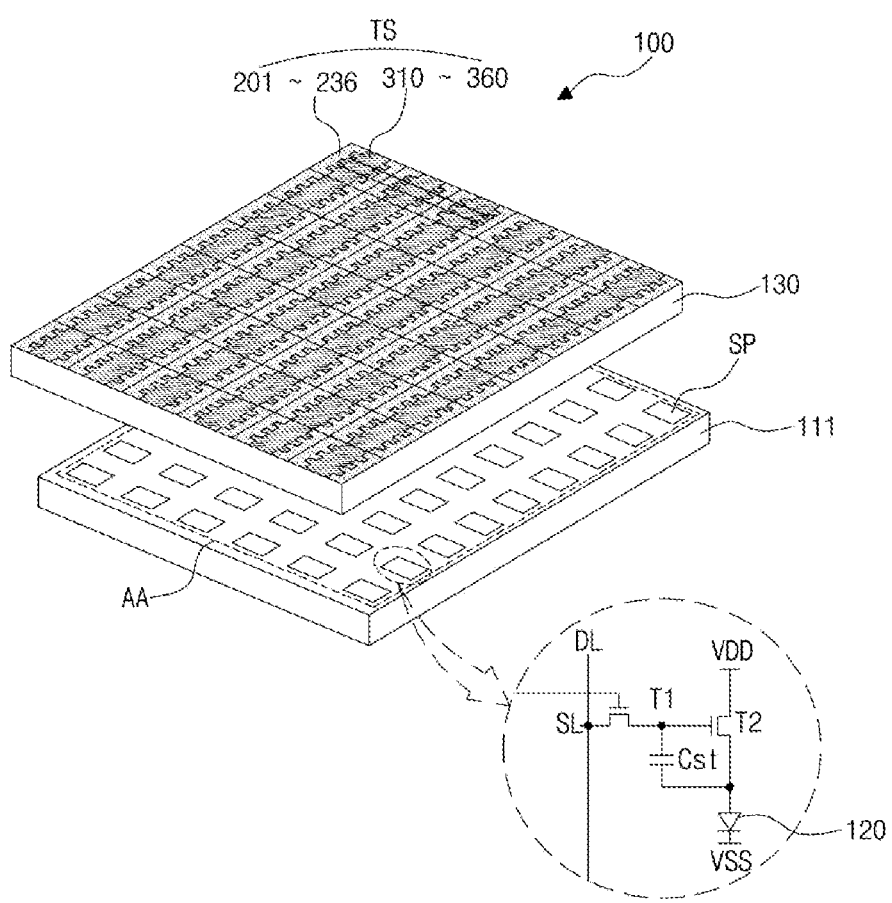
FIG. 1 is a perspective view showing a touch display device according to a first embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a touch display device according to embodiments of the present disclosure will be described in detail with reference to the accompanying drawings. In the following description, like reference numerals designate like elements throughout. When a detailed description of well-known functions or configurations related to this document is determined to unnecessarily cloud a gist of the inventive concept, the detailed description thereof will be omitted or will be made brief.

FIG. 1 is a perspective view showing a touch display device according to a first embodiment of the present disclosure.

In FIG. 1, a touch display device 100 including a touch sensor TS senses a touch and a touch position by detecting a change of a mutual capacitance due to a touch by a user through a plurality of touch electrodes 201 to 236 and 310 to 360 during a touch period.

The touch display device 100 including the touch sensor TS displays a image through a plurality of pixels P each having a light emitting diode 120 during a display period.

Each of the plurality of pixels includes red, green and blue subpixels SP or red, green, blue and white subpixels SP.

The touch display device 100 includes a plurality of subpixels SP in a matrix on a substrate 111, an encapsulating layer 130 over the plurality of subpixels SP and a touch sensor TS over the encapsulating layer 130.

The substrate 111 of the touch display device 100 includes a display area AA, and the plurality of subpixels SP are disposed in the display area AA to display an image. Each of the plurality of subpixels SP includes a pixel driving circuit and a light emitting diode 120 connected to the pixel driving circuit.

The pixel driving circuit may include a switching thin film transistor (TFT) T1, a driving TFT T2 and a storage capacitor Cst. When a scan signal is supplied to a scan line SL, the switching TFT T1 is turned on to transmit a data signal supplied to a data line DL to the storage capacitor Cst and a gate electrode of the driving TFT T2.

The driving TFT T2 adjusts current supplied to the light emitting diode 120 from a high level voltage VDD in response to the data signal supplied to the gate electrode of the driving TFT T2 to control an emission amount of the light emitting diode 120.

Even after the switching TFT T1 is turned off, the driving TFT T2 supplies a constant current due to a voltage charged in the storage capacitor Cst till the data signal of a next frame is supplied to keep the light emitting diode 120 emitting a light.

The driving TFT T2 includes a gate electrode, a gate insulating layer on the gate electrode, a semiconductor layer over the gate insulating layer to overlap the gate electrode, a passivation layer on the semiconductor layer and source and drain electrodes on the passivation layer to contact the semiconductor layer.

The light emitting diode includes an anode, at least one light emitting layer on the anode and a cathode on the at least one light emitting layer.

The anode is electrically connected to the drain electrode of the driving TFT T2.

The light emitting layer is disposed on the anode in an emission area defined by a bank. The light emitting layer may have a single layer of an emitting material or have multiple layers including a hole injecting layer, a hole transporting layer, an emitting material layer, an electron transporting layer and an electron injecting layer for increasing an emission efficiency.

The cathode faces the anode with the light emitting layer interposed therebetween.

When a voltage is applied to the anode and the cathode of the light emitting diode 120, a hole injected from the anode and an electron injected from the cathode are transmitted to the light emitting layer to constitute an exciton. When the exciton transitions from an excited state to a ground state, a light is emitted from the light emitting layer to an exterior.

The encapsulating layer 130 prevents moisture or oxygen of an exterior from penetrating into the light emitting diode 120. The encapsulating layer 130 may include a plurality of inorganic layers and a plurality of organic layers between the inorganic layers, and the inorganic layer may be disposed as an uppermost layer.

The touch sensor TS is disposed on the encapsulating layer 130. The touch display device 100 does not include an additional routing area where a routing line for applying a signal to the touch sensor TS is formed.

In the touch display device 100, since a plurality of routing lines for transmitting signals between a plurality of driving electrodes 201 to 236 and a plurality of sensing electrodes 310 to 360 are disposed not in a non-display area NA (of FIG. 2) but in a touch area TA (of FIG. 2), a routing area including a routing line at a side of the touch sensor TS is omitted.

As a result, the touch sensor TS having a narrow bezel is provided.

Figure 2:
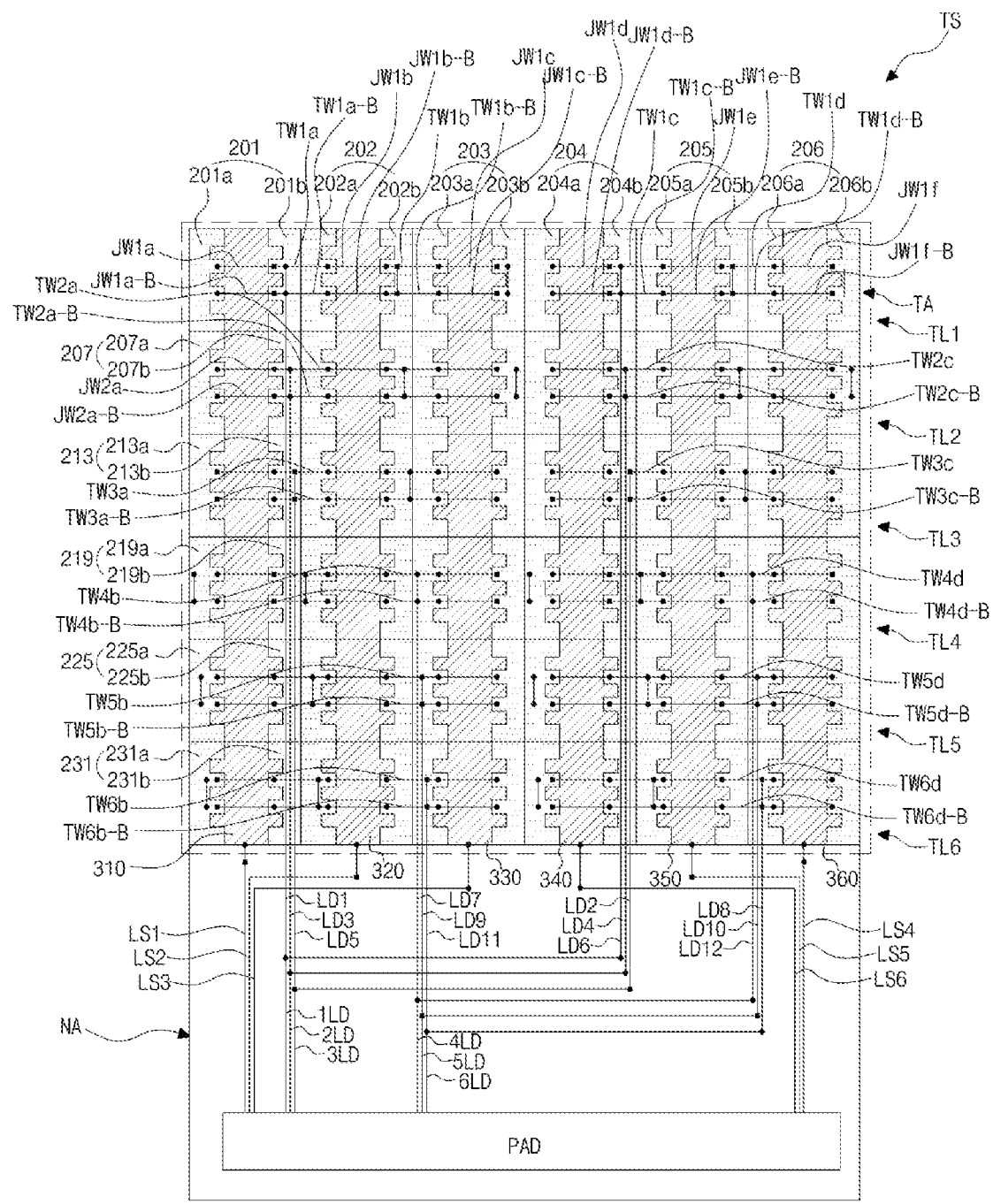
FIG. 2 is a plan view showing a touch sensor of a touch display device according to a first embodiment of the present disclosure.
Figure 3:
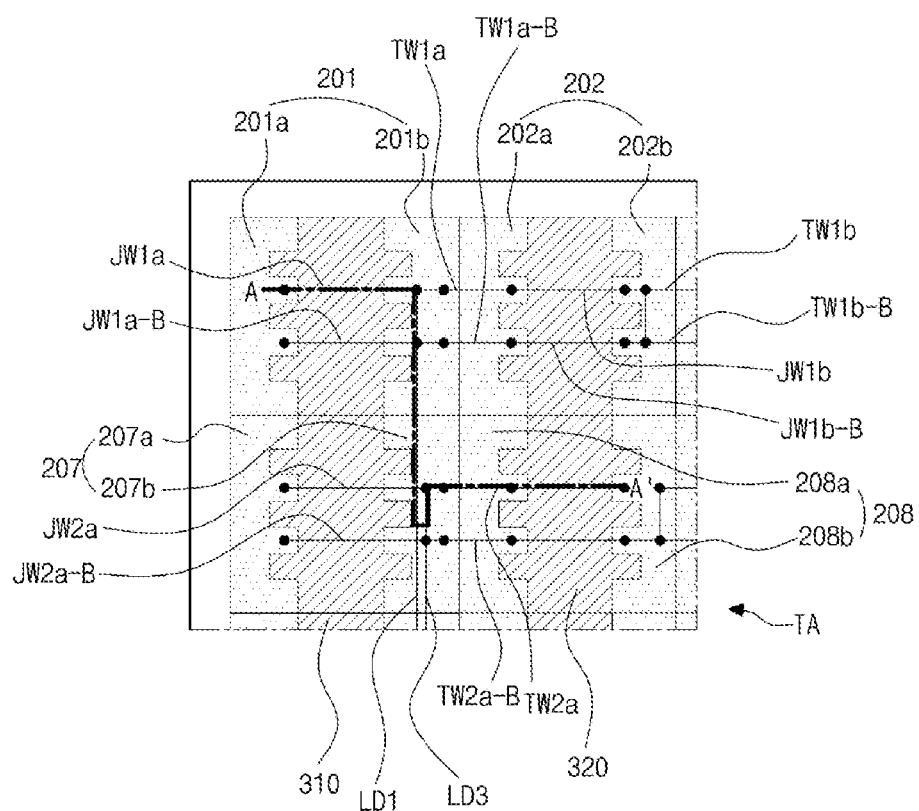
FIG. 3 is a magnified view showing a portion of FIG. 2.

FIG. 2 is a plan view showing a touch sensor of a touch display device according to a first embodiment of the present disclosure, and FIG. 3 is a magnified view showing a portion of FIG. 2.

In FIGS. 2 and 3, the touch sensor TS includes a touch area TA and a non-display area NA. A plurality of driving electrodes 201 to 236 and a plurality of sensing electrodes 310 to 360 are disposed in the touch area TA, and a pad portion is disposed in the non-display area NA.

The plurality of driving electrodes 201 to 236 include a plurality of unit electrodes connected along an X axis (a horizontal direction) to constitute first, second, third, fourth, fifth and sixth row touch driving lines TL1, TL2, TL3, TL4, TL5 and TL6.

For example, the plurality of driving electrodes 201 to 236 having a comb pattern may be symmetrically connected, and the plurality of driving electrodes 201 to 236 may be connected to each other through a plurality of bridge lines TW1a to TW6d to constitute the plurality of electrode rows.

The plurality of sensing electrodes 310 to 360 each having a single electrode have a bar shape extending along a Y axis (a vertical direction).

The plurality of sensing electrodes 310 to 360 may have a comb pattern alternating with the comb pattern of the plurality of driving electrodes 201 to 236 such that the plurality of driving electrodes 201 to 236 and the plurality of sensing electrodes 310 to 360 have a shape of a comb type.

Alternatively, the plurality of driving electrodes 201 to 236 and the plurality of sensing electrodes 310 to 360 having a shape of a comb type may have a mesh shape having a plurality of openings. The plurality of openings may correspond to an emission area where light is emitted from the plurality of subpixels SP (of FIG. 1).

The shape of the plurality of driving electrodes 201 to 236 and the plurality of sensing electrodes 310 to 360 are not limited to the first embodiment. The plurality of driving electrodes 201 to 236 and the plurality of sensing electrodes 310 to 360 may have various shapes.

For example, first to thirty-sixth driving electrodes 201 to 236 and first to sixth sensing electrodes 310 to 360 are disposed in the touch area TA. The first to sixth driving electrodes 201 to 206 are disposed along the X axis (the horizontal direction), spaced apart from each other, and are connected to each other through first bridge lines TW1a to TW1d to constitute a first row touch driving line TL1.

The seventh to twelfth driving electrodes 207 to 212 are disposed adjacent to the first to sixth driving electrodes 201 to 206 along the Y axis (the vertical direction) to be spaced apart from each other and are connected to each other through second bridge lines TW2a to TW2d to constitute a second row touch driving line TL2.

The thirteenth to eighteenth driving electrodes 213 to 218 are connected to each other through third bridge lines TW3a to TW3d to constitute a third row touch driving line TL3, and the nineteenth to twenty-fourth driving electrodes 219 to 224 are connected to each other through fourth bridge lines TW4a to TW4d to constitute a fourth row touch driving line TL4.

The twenty-fifth to thirtieth driving electrodes 225 to 230 are connected to each other through fifth bridge lines TW5a to TW5d to constitute a fifth row touch driving line TL5, and the thirty-first to thirty-sixth driving electrodes 231 to 236 are connected to each other through sixth bridge lines TW6a to TW6d to constitute a sixth row touch driving line TL6.

In addition, first to sixth auxiliary bridge lines TW1a-B to TW6d-B may be disposed adjacent to the first to sixth bridge lines TW1a to TW6d. The first to sixth bridge lines TW1a to TW6d may be electrically connected to the first to sixth auxiliary bridge lines TW1a-B to TW6d-B, respectively.

Since the first to sixth auxiliary bridge lines TW1a-B to TW6d-B reduce resistance of the first to sixth bridge lines TW1a to TW6d, a touch sensitivity by the first to sixth bridge lines TW1a to TW6d is improved.

The first to sixth sensing electrodes 310 to 360 are disposed to cross the first to sixth row touch driving lines TL1 to TL6. The first sensing electrode 310 is disposed to cross the first, seventh, thirteenth, nineteenth, twenty-fifth and thirty-first driving electrodes 201, 207, 213, 219, 225 and 231, and the second sensing electrode 320 is disposed to cross the second, eighth, fourteenth, twentieth, twenty-sixth and thirty-second driving electrodes 202, 208, 214, 220, 226 and 232.

The third sensing electrode 330 is disposed to cross the third, ninth, fifteenth, twenty-first, twenty-seventh and thirty-third driving electrodes 203, 209, 215, 221, 227 and 233, and the fourth sensing electrode 340 is disposed to cross the fourth, tenth, sixteenth, twenty-second, twenty-eighth and thirty-fourth driving electrodes 204, 210, 216, 222, 228 and 234.

The fifth sensing electrode 350 is disposed to cross the fifth, eleventh, seventeenth, twenty-third, twenty-ninth and thirty-fifth driving electrodes 205, 211, 217, 223, 229 and 235, and the sixth sensing electrode 360 is disposed to cross the sixth, twelfth, eighteenth, twenty-fourth, thirtieth and thirty-sixth driving electrodes 206, 212, 218, 224, 230 and 236.

Although the plurality of driving electrodes 201 to 236 are illustrated to be blocked as the first to thirty-sixth driving electrodes for convenience, the first driving electrode 201 is defined as first-first and first-second driving electrodes 201a and 201b symmetrical to each other and the first-first and first-second driving electrodes 201a and 201b are connected to each other through a first-first jumping line JW1a.

The seventh driving electrode 207 is defined as seventh-first and seventh-second driving electrodes 207a and 207b connected to each other through a second-first jumping line JW2a, and the thirteenth driving electrode 213 is defined as thirteenth-first and thirteenth-second driving electrodes 213a and 213b connected to each other through a third-first jumping line JW3a. The nineteenth driving electrode 219 is defined as nineteenth-first and nineteenth-second driving electrodes 219a and 219b connected to each other through a fourth-first jumping line JW4a, the twenty-fifth driving electrode 225 is defined as twenty-fifth-first and twenty-fifth-second driving electrodes 225a and 225b connected to each other through a fifth-first jumping line JW5a, and the thirty-first driving electrode 231 is defined as thirty-first-first and thirty-first-second driving electrodes 231a and 231b connected to each other through a sixth-first jumping line JW6a.

As a result, the first sensing electrode 310 crossing the first, seventh, thirteenth, nineteenth, twenty-fifth and thirty-first driving electrodes 201, 207, 213, 219, 225 and 231 is substantially disposed between the first-first and first-second driving electrodes 201a and 201b, between the seventh-first and seventh-second driving electrodes 207a and 207b, between the thirteenth-first and thirteenth-second driving electrodes 213a and 213b, between the nineteenth-first and nineteenth-second driving electrodes 219a and 219b, between the twenty-fifth-first and twenty-fifth-second driving electrodes 225a and 225b and between the thirty-first-first and thirty-first-second driving electrodes 231a and 231b.

Each of the second to sixth, eighth to twelfth, fourteenth to eighteenth, twentieth to twenty-fourth, twenty-sixth to thirtieth and thirty-second to thirty-sixth driving electrodes 202 to 206, 208 to 212, 214 to 218, 220 to 224, 226 to 230 and 232 to 236 is defined as two driving electrodes symmetrical to each other and the two driving electrodes are connected to each other through one of the first to sixth jumping lines JW1b to JW1f, JW2b to JW2f, JW3b to JW3f, JW4b to JW4f, JW5b to JW5f and JW6b to JW6f.

As a result, the second to sixth sensing electrodes 320 to 360 are disposed between the second to sixth, eighth to twelfth, fourteenth to eighteenth, twentieth to twenty-fourth, twenty-sixth to thirtieth and thirty-second to thirty-sixth driving electrodes 202 to 206, 208 to 212, 214 to 218, 220 to 224, 226 to 230 and 232 to 236.

The first-first and first-second driving electrodes 201a and 201b are symmetrically disposed to include a comb pattern protruding toward each other. The first sensing electrode 310 includes a comb pattern alternating with a comb pattern of the first-first driving electrode 201a and a comb pattern alternating with a comb pattern of the first-second driving electrode 201b.

The second to thirty-sixth driving electrodes 202 to 236 are symmetrically disposed to include a comb pattern protruding toward each other. The second to sixth sensing electrodes 320 to 360 include a comb pattern alternating with a comb pattern of the second to thirty-sixth driving electrodes 202 to 236.

First to sixth auxiliary jumping lines JW1a-B to JW6f-B are disposed adjacent to the first to sixth jumping lines JW1a to JW6f. The first to sixth jumping lines JW1a to JW6f are electrically connected to the first to sixth auxiliary jumping lines JW1a-B to JW6f-B, respectively.

Routing lines LD1 to LD12 and LS1 to LS6 are disposed in the pad portion of the non-display area NA. First to sixth driving routing lines LD1 to LD6 extend to be connected to first to sixth bridge lines TW1a to TW6d, respectively, and first to sixth sensing routing lines LS1 to LS6 are connected to the first to sixth sensing electrodes 310 to 360, respectively.

A touch driving part PAD is connected to the plurality of row touch driving lines TL1 to TL6 through the plurality of driving routing lines LD1 to LD6 to transmit a touch driving signal. The touch driving part PAD receives a touch sensing signal from the plurality of sensing electrodes 310 to 360 through the plurality of sensing routing lines LS1 to LS6.

Hereinafter, operation of the touch driving part PAD will be illustrated in detail. The touch driving part PAD sequentially applies the touch driving signal to the plurality of driving electrodes 201 to 236 of the touch sensor TS. A capacitance is generated between the plurality of driving electrodes 201 to 236 and the plurality of sensing electrodes 310 to 360 by sequentially applying the touch driving signal for sensing a touch to the plurality of driving electrodes 201 to 236 of the touch sensor TS.

The touch driving part PAD receives the touch sensing signal according to the sequentially applied touch driving signal through the plurality of sensing electrodes 310 to 360 to determine a touch input position of a user. The touch sensing signal includes a change of the capacitance between the plurality of driving electrodes 201 to 236 and the plurality of sensing electrodes 310 to 360 by the touch driving signal sequentially applied to the plurality of driving electrodes 201 to 236 of the touch sensor TS according to a finger touch.

The touch driving part PAD sequentially receives the change of the capacitance between the first driving electrode 201 and the plurality of sensing electrodes 310 to 360 according to the touch driving signal applied to the first driving electrode 201 through the plurality of sensing electrodes 310 to 360. Next, the touch driving part PAD sequentially receives the change of the capacitance between the second driving electrode 202 and the plurality of sensing electrodes 310 to 360 according to the touch driving signal applied to the second driving electrode 202 through the plurality of sensing electrodes 310 to 360. Similarly, the touch driving part PAD sequentially receives the change of the capacitance according to the touch driving signal applied to the other driving electrodes. The touch driving part PAD sequentially receives the change of the capacitance between the last driving electrode 236 and the plurality of sensing electrodes 310 to 360 according to the touch driving signal applied to the last driving electrode 236 through the plurality of sensing electrodes 310 to 360.

In the touch display device 100 (of FIG. 1) according to a first embodiment of the present disclosure, the first driving routing line LD1 extends from the first-first and first-second bridge lines TW1a and TW1b connecting the first to third driving electrodes 201 to 203, and the second driving routing line LD2 extends from the first-third and first-fourth bridge lines TW1c and TW1d connecting the fourth to sixth driving electrodes 204 to 206.

The third driving routing line LD3 extends from the second-first and second-second bridge lines TW2a and TW2b connecting the seventh to ninth driving electrodes 207 to 209, and the fourth driving routing line LD4 extends from the second-third and second-fourth bridge lines TW2c and TW2d connecting the tenth to twelfth driving electrodes 210 to 212.

The fifth driving routing line LD5 extends from the third-first and third-second bridge lines TW3a and TW3b connecting the thirteenth to fifteenth driving electrodes 213 to 215, and the sixth driving routing line LD6 extends from the third-third and third-fourth bridge lines TW3c and TW3d connecting the sixteenth to eighteenth driving electrodes 216 to 218. The seventh driving routing line LD7 extends from the fourth-first and fourth-second bridge lines TW4a and TW4b connecting the nineteenth to twenty-first driving electrodes 219 to 221, and the eighth driving routing line LD8 extends from the fourth-third and fourth-fourth bridge lines TW4c and TW4d connecting the twenty-second to twenty-fourth driving electrodes 222 to 224.

The ninth driving routing line LD9 extends from the fifth-first and fifth-second bridge lines TW5a and TW5b connecting the twenty-fifth to twenty-seventh driving electrodes 225 to 227, and the tenth driving routing line LD10 extends from the fifth-third and fifth-fourth bridge lines TW5c and TW5d connecting the twenty-eighth to thirtieth driving electrodes 228 to 230. The eleventh driving routing line LD11 extends from the sixth-first and sixth-second bridge lines TW6a and TW6b connecting the thirty-first to thirty-third driving electrodes 231 to 233, and the twelfth driving routing line LD12 extends from the sixth-third and sixth-fourth bridge lines TW6c and TW6d connecting the thirty-fourth to thirty-sixth driving electrodes 234 to 236.

Specifically, in the touch display device 100 (of FIG. 1), the touch sensor TS and the first to twelfth driving routing lines LD1 to LD12 are disposed in the touch area TA. The first to twelfth driving routing lines LD1 to LD12 are disposed between the first to thirty-sixth driving electrodes 201 to 236.

The touch area TA may be reduced due to the first to twelfth driving routing lines LD1 to LD12, and the touch driving signal may be attenuated in the first to twelfth driving routing lines LD1 to LD12. As a result, it is required to distribute the first to twelfth driving routing lines LD1 to LD12 uniformly. The first, third and fifth driving routing lines LD1, LD3 and LD5 are disposed between the first, seventh, thirteenth, nineteenth, twenty-fifth and thirty-first driving electrodes 201, 207, 213, 219, 225 and 231 and the second, eighth, fourteenth, twentieth, twenty-sixth and thirty-second driving electrodes 202, 208, 214, 220, 226 and 232. The second, fourth and sixth driving routing lines LD2, LD4 and LD6 are disposed between the fourth, tenth, sixteenth, twenty-second, twenty-eighth and thirty-fourth driving electrodes 204, 210, 216, 222, 228 and 234 and the fifth, eleventh, seventeenth, twenty-third, twenty-ninth and thirty-fifth driving electrodes 205, 211, 217, 223, 229 and 235.

The seventh, ninth and eleventh driving routing lines LD7, LD9 and LD11 are disposed between the twentieth, twenty-sixth and thirty-second driving electrodes 220, 226 and 232 and the twenty-first, twenty-seventh and thirty-third driving electrodes 221, 227 and 233. The eighth, tenth and twelfth driving routing lines LD8, LD10 and LD12 are disposed between the twenty-third, twenty-ninth and thirty-fifth driving electrodes 223, 229 and 235 and the twenty-fourth, thirtieth and thirty-sixth driving electrodes 224, 230 and 236.

As a result, the first driving routing line LD1 is connected to the first-first bridge line TW1a (the first-first auxiliary bridge line TW1a-B) connecting the first and second driving electrodes 201 and 202, the third driving routing line LD3 is connected to the second-first bridge line TW2a (the second-first auxiliary bridge line TW2a-B) connecting the seventh and eighth driving electrodes 207 and 208, and the fifth driving routing line LD5 is connected to the third-first bridge line TW3a (the third-first auxiliary bridge line TW3a-B) connecting the thirteenth and fourteenth driving electrodes 213 and 214.

The second driving routing line LD2 is connected to the first-third bridge line TW1c (the first-third auxiliary bridge line TW1c-B) connecting the fourth and fifth driving electrodes 204 and 205, the fourth driving routing line LD4 is connected to the second-third bridge line TW2c (the second-third auxiliary bridge line TW2c-B) connecting the tenth and eleventh driving electrodes 210 and 211, and the sixth driving routing line LD6 is connected to the third-third bridge line TW3c (the third-third auxiliary bridge line TW3c-B) connecting the sixteenth and seventeenth driving electrodes 216 and 217.

The seventh driving routing line LD7 is connected to the fourth-second bridge line TW4b (the fourth-second auxiliary bridge line TW4b-B) connecting the twentieth and twenty-first driving electrodes 220 and 221, the ninth driving routing line LD9 is connected to the fifth-second bridge line TW5b (the fifth-second auxiliary bridge line TW5b-B) connecting the twenty-sixth and twenty-seventh driving electrodes 226 and 227, the eleventh driving routing line LD11 is connected to the sixth-second bridge line TW6b (the sixth-second auxiliary bridge line TW6b-B) connecting the thirty-second and thirty-third driving electrodes 232 and 233, the eighth driving routing line LD8 is connected to the fourth-fourth bridge line TW4d (the fourth-fourth auxiliary bridge line TW4d-B) connecting the twenty-third and twenty-fourth driving electrodes 223 and 224, the tenth driving routing line LD10 is connected to the fifth-fourth bridge line TW5d (the fifth-fourth auxiliary bridge line TW5d-B) connecting the twenty-ninth and thirtieth driving electrodes 229 and 230, and the twelfth driving routing line LD12 is connected to the sixth-fourth bridge line TW6d (the sixth-fourth auxiliary bridge line TW6d-B) connecting the thirty-fifth and thirty-sixth driving electrodes 235 and 236.

In the touch display device 100 (of FIG. 1) according to a first embodiment of the present disclosure, since the plurality of routing lines LD1 to LD12 are disposed between the plurality of driving electrodes 201 to 236 in the touch area TA, an area for the plurality of routing lines at both sides of the touch area TA may be omitted.

As a result, the touch sensor TS having a narrow bezel at both sides of the touch area TA is obtained.

The first and second driving routing lines LD1 and LD2 are connected to each other through a first connecting routing line 1LD, the third and fourth driving routing lines LD3 and LD4 are connected to each other through a second connecting routing line 2LD, the fifth and sixth driving routing lines LD5 and LD6 are connected to each other through a third connecting routing line 3LD, the seventh and eighth driving routing lines LD7 and LD8 are connected to each other through a fourth connecting routing line 4LD, the ninth and tenth driving routing lines LD9 and LD10 are connected to each other through a fifth connecting routing line 5LD, and the eleventh and twelfth driving routing lines LD11 and LD12 are connected to each other through a sixth connecting routing line 6LD. Although the touch display device 100 has a double routing structure where two of the plurality of driving routing lines LD1 to LD12 are connected to the touch driving part PAD through one of the plurality of connecting routing lines 1LD to 6LD, it is not limited thereto.

For example, the touch display device 100 may have a single routing structure where the first to twelfth driving routing lines LD1 to LD12 are individually connected to the touch driving part PAD to improve a resistance capacitance (RC) delay caused by a resistance of the driving electrodes 201 to 236 and the first to twelfth driving routing lines LD1 to LD12.

Figure 4A:
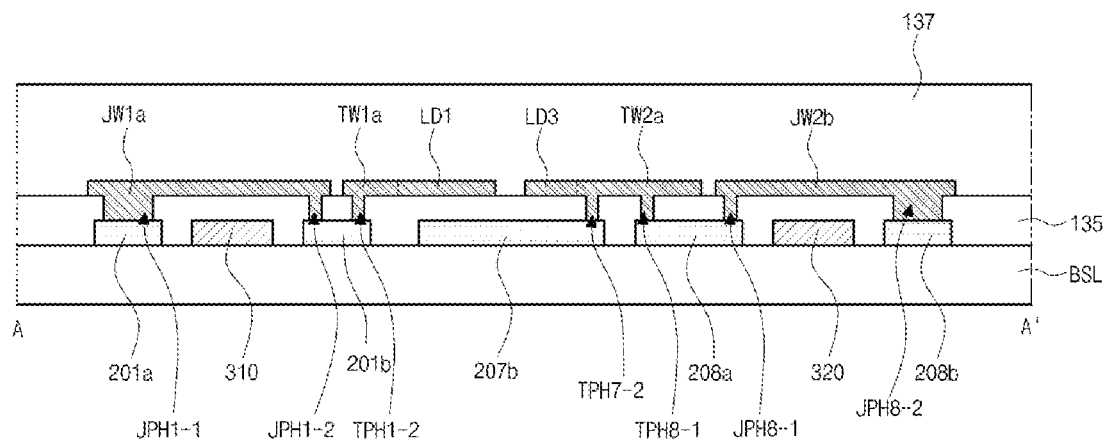
FIGS. 4A and 4B are cross-sectional views taken along a line A-A' of FIG. 3.
Figure 4B:
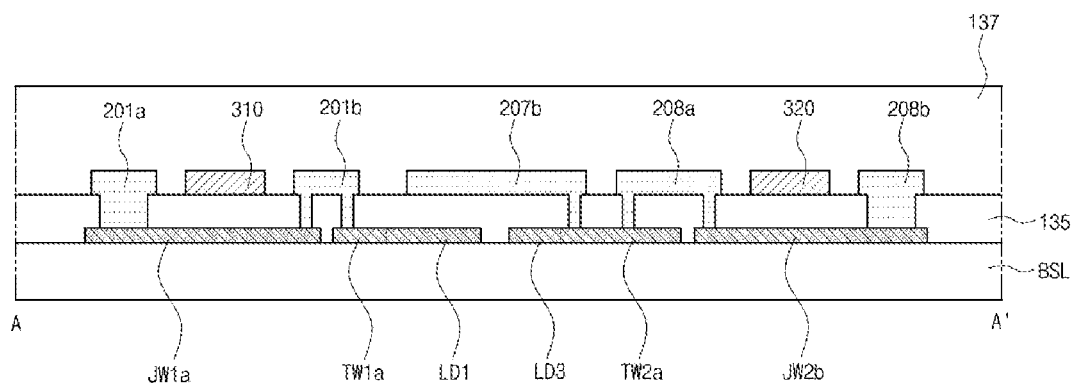

FIGS. 4A and 4B are cross-sectional views taken along a line A-A' of FIG. 3.

In FIG. 4A, the touch sensor TS (of FIG. 2) includes the plurality of driving electrodes 201a, 201b, 207b, 208a and 208b and the plurality of sensing electrodes 310 and 320 on a base film BSL. The base film BSL may be the encapsulating layer 130 (of FIG. 1) of the touch display device 100 (of FIG. 1) or may be a touch buffer layer over the encapsulating layer 130.

The first, seventh and eighth driving electrodes 201, 207 and 208 (of FIG. 3) are divided into the first-first and first-second driving electrodes 201a and 201b, the seventh-first and seventh-second driving electrodes 207a and 207b (of FIG. 3), and the eighth-first and eighth-second driving electrodes 208a and 208b. The plurality of driving electrodes 201a, 201b, 207b, 208a and 208b on the base film BSL are spaced apart from each other. The first sensing electrode 310 is disposed between the first-first and first-second driving electrodes 201a and 201b and between the seventh-first and seventh-second driving electrodes 207a and 207b, and the second sensing electrode 320 is disposed between the eighth-first and eighth-second driving electrodes 208a and 208b.

A touch insulating layer 135 is disposed on the plurality of driving electrodes 201a, 201b, 207b, 208a and 208b and the first and second sensing electrodes 310 and 320. The touch insulating layer 135 has a first-first jumping contact hole JPH1-1 exposing the first-first driving electrode 201a, a first-second jumping contact hole JPH1-2 exposing a first end portion of the first-second driving electrode 201b, a first-second bridge contact hole TPH1-2 exposing a second end portion of the first-second driving electrode 201b, a seventh-second bridge contact hole TPH7-2 exposing the seventh-second driving electrode 207b, an eighth-first bridge contact hole TPH8-1 exposing a first end portion of the eighth-first driving electrode 208a, an eighth-first jumping contact hole JPH8-1 exposing a second end portion of the eighth-first driving electrode 208a and an eighth-second jumping contact hole JPH8-2 exposing the eighth-second driving electrode 208b.

The first-first jumping line JW1a connecting first end portions of the first-first and first-second driving electrodes 201a and 201b exposed through the first-first and first-second jumping contact holes JPH1-1 and JPH1-2 is disposed on the touch insulating layer 135, and the first-first bridge line TW1a connecting second end portions of the first-second and second-first driving electrodes 201b and 202a exposed through the first-second bridge contact hole TPH1-2 is disposed on the touch insulating layer 135.

The second-first bridge line TW2a connecting first end portions of the seventh-second and eighth-first driving electrodes 207b and 208a exposed through the seventh-second and eighth-first bridge contact holes TPH7-2 and TPH8-1 is disposed on the touch insulating layer 135, and the second-second jumping line JW2b connecting second end portions of the eighth-first and eighth-second driving electrodes 208a and 208b exposed through the eighth-first and eighth-second jumping contact holes JPH8-1 and JPH8-2 is disposed on the touch insulating layer 135.

As a result, the first-first and first-second driving electrodes 201a and 201b are electrically connected to each other through the first-first jumping line JW1a, and the eighth-first and eighth-second driving electrodes 208a and 208b are electrically connected to each other through the second-second jumping line JW2b.

In addition, the first-second and second-first driving electrodes 201b and 202a are electrically connected to each other through the first-first bridge line TW1a, and the seventh-second and eighth-first driving electrodes 207b and 208a are electrically connected to each other through the second-first bridge line TW2a.

The first driving routing line LD1 extending from the first-first bridge line TW1a is disposed on the touch insulating layer 135, and the third driving routing line LD3 extending from the second-first bridge line TW2a is disposed at one side of the first driving routing line LD1.

Accordingly, in the touch display device 100 (of FIG. 1) according to a first embodiment of the present disclosure, the first, third and fifth driving routing lines LD1, LD3 and LD5 may be disposed between the first, seventh, thirteenth, nineteenth, twenty-fifth and thirty-first driving electrodes 201, 207, 213, 219, 225 and 231 and the second, eighth, fourteenth, twentieth, twenty-sixth and thirty-second driving electrodes 202, 208, 214, 220, 226 and 232 in the touch area TA (of FIG. 2) without electric interference.

A touch protecting layer 137 is disposed on the first-first and second-second jumping lines JW1a and JW2b, the first-first and second-first bridge lines TW1a and TW2a and the first and third driving routing lines LD1 and LD3. The touch protecting layer 137 prevents corrosion of the driving electrodes 201a, 201b, 207b, 208a and 208b, the sensing electrodes 310 and 320, the jumping lines JW1a and JW2b, the bridge lines TW1a and TW2a and the routing lines LD1 and LD3 due to an external moisture, etc.

In FIG. 4B, the first-first and second-second jumping lines JW1a and JW2b, the first-first and second-first bridge lines TW1a and TW2a and the first and third driving routing lines LD1 and LD3 may be disposed on the base film BSL, the touch insulating layer 135 may be disposed on the first-first and second-second jumping lines JW1a and JW2b, the first-first and second-first bridge lines TW1a and TW2a and the first and third driving routing lines LD1 and LD3, and the first-first and first-second driving electrodes 201a and 201b, the seventh-second driving electrode 207b, the eighth-first and eighth-second driving electrodes 208a and 208b and first and second sensing electrodes 310 and 320 may be disposed on the touch insulating layer 135.

Although not shown, the second, fourth and sixth driving routing lines LD2, LD4 and LD6 and the seventh to twelfth driving routing lines LD7 to LD12 may be similarly disposed in the touch area TA (of FIG. 2) without an electric interference.

In the touch display device 100 (of FIG. 1) according to a first embodiment of the present disclosure, the plurality of driving electrodes 201 to 236 (of FIG. 2) are classified into the first to sixth row touch driving lines TL1 to TL6 through the first-first to sixth-fourth bridge lines TW1a to TW6d (of FIG. 2), and at least one of the plurality of driving routing line LD1 to LD12 (of FIG. 2) extends from each row touch driving line TL1 to TL6 (of FIG. 2).

As a result, a number of the plurality of driving routing lines LD1 to LD12 (of FIG. 2) is reduced, and the plurality of driving routing lines LD1 to LD12 (of FIG. 2) are disposed between the plurality of driving electrodes 201 to 236 (of FIG. 2) in the touch area TA (of FIG. 2).

Specifically, since the plurality of driving routing lines LD1 to LD12 (of FIG. 2) are disposed to overlap the plurality of driving electrodes 201 to 236 (of FIG. 2), a touch accuracy is improved. Since areas for the plurality of routing lines at both sides of the touch area TA (of FIG. 2) are omitted, the touch sensor TS (of FIG. 2) having a narrow bezel at both sides of the touch area TA (of FIG. 2) is provided.

Figure 5:
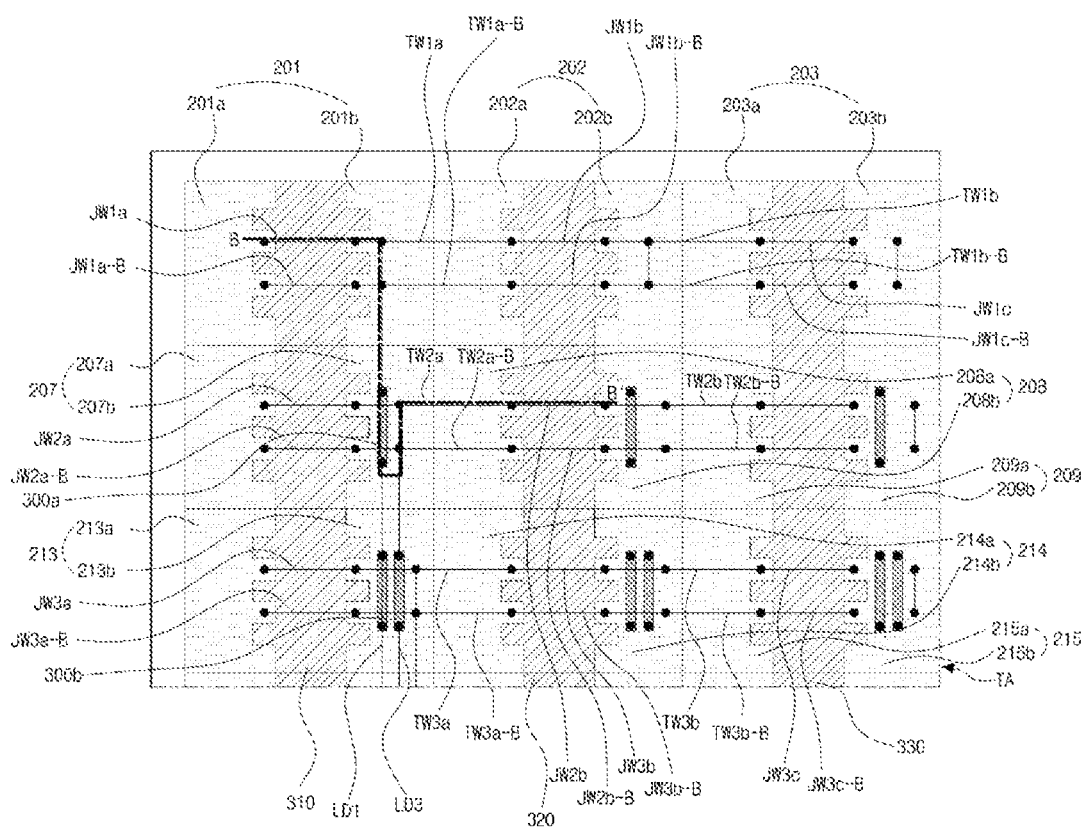
FIG. 5 is a plan view showing a touch sensor of a touch display device according to a second embodiment of the present disclosure.

FIG. 5 is a plan view showing a touch sensor of a touch display device according to a second embodiment of the present disclosure.

To avoid repetition of illustration, a part having the same function as a part of a first embodiment is designated by the same reference number, and a characteristic part of a second embodiment will be illustrated.

In FIG. 5, a touch display device 100 (of FIG. 1) according to a second embodiment of the present disclosure includes a touch sensor TS. Since a plurality of driving routing lines LD1 to LD12 of the touch sensor TS are disposed between a plurality of driving electrodes 201 to 236 in a touch area TA, the plurality of driving routing lines LD1 to LD12 and a plurality of bridge lines TW2a to TW6d cross each other, and floating electrodes 300a and 300b are further disposed at partial driving electrodes 201b to 236b of the plurality of driving electrodes 201 to 236.

The first driving routing line LD1 extending from the first-first bridge line TW1a connecting the first and second driving electrodes 201 and 202 extends toward a non-display area NA at one side of the touch area TA. The first driving routing line LD1 crosses the second-first bridge line TW2a (a second-first auxiliary bridge line TW2a-B) connecting the seventh and eighth driving electrodes 207 and 208 and the third-first bridge line TW3a (a third-first auxiliary bridge line TW3a-B) connecting the thirteenth and fourteenth driving electrodes 213 and 214.

The first floating electrode 300a insulated from the seventh-second driving electrode 207b and the thirteenth-second driving electrode 213b is disposed at the seventh-second driving electrode 207b of the seventh driving electrode 207 and the thirteenth-second driving electrode 213*b* of the thirteenth driving electrode 213.

As a result, the first driving routing line LD1 extending from the first-first bridge line TW1*a* is electrically connected to the first floating electrode 300*a* in a region where the second-first bridge line TW2*a* (the second-first auxiliary bridge line TW2*a*-B) and the third-first bridge line TW3*a* (the third-first auxiliary bridge line TW3*a*-B) cross each other.

The first floating electrode 300*a* is disposed in each of second to sixth row touch driving lines TL2 to TL6 to correspond to a region where the first driving routing line LD1 and the bridge lines TW1*a*, TW2*a*, TW3*a*, TW1*a*-B, TW2*a*-B and TW3*a*-B cross each other.

The third driving routing line LD3 extending from the second-first bridge line TW2*a* connecting the seventh and eighth driving electrodes 207 and 208 extends toward the non-display area NA at one side of the touch area TA. The third driving routing line LD3 crosses the third-first bridge line TW3*a* (a third-first auxiliary bridge line TW3*a*-B) connecting the thirteenth and fourteenth driving electrodes 213 and 214.

As a result, the second floating electrode 300*b* connected to the third driving routing line LD3 is disposed at a side of the first floating electrode 300*a* and at the thirteenth-second driving electrode 213*b* of the thirteenth driving electrode 213.

The second floating electrode 300*b* is disposed in each of the third to sixth row touch driving lines TL3 to TL6 to correspond to a region where the third driving routing line LD3 and the bridge lines TW2*a*, TW3*a*, TW2*a*-B and TW3*a*-B cross each other.

Although not shown, the fifth driving routing line LD5 crossing the bridge lines TW4*a*, TW5*a*, TW6*a*, TW4*a*-B, TW5*a*-B and TW6*a*-B connecting the nineteenth and twentieth driving electrodes 219 and 220, the twenty-fifth and twenty-sixth driving electrodes 225 and 226 and the thirty-first and thirty-second driving electrodes 231 and 232 extends toward the non-display area NA through a third floating electrode, and the third floating electrode is disposed at a side of the second floating electrode 300*b*.

The second, fourth, sixth and seventh to twelfth driving routing lines LD2, LD4, LD6 and LD7 to LD12 extend from the touch area TA to the non-display area NA through the floating electrodes.

Figure 6A:
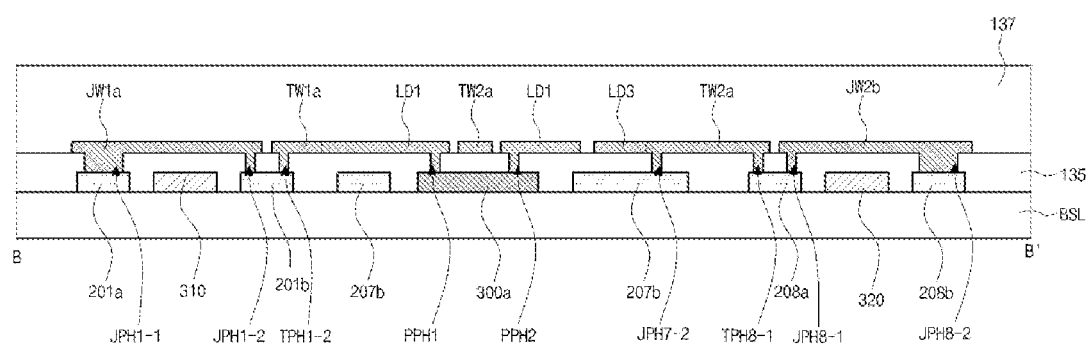
FIGS. 6A and 6B are cross-sectional views taken along a line B-B' of FIG. 5.
Figure 6B:
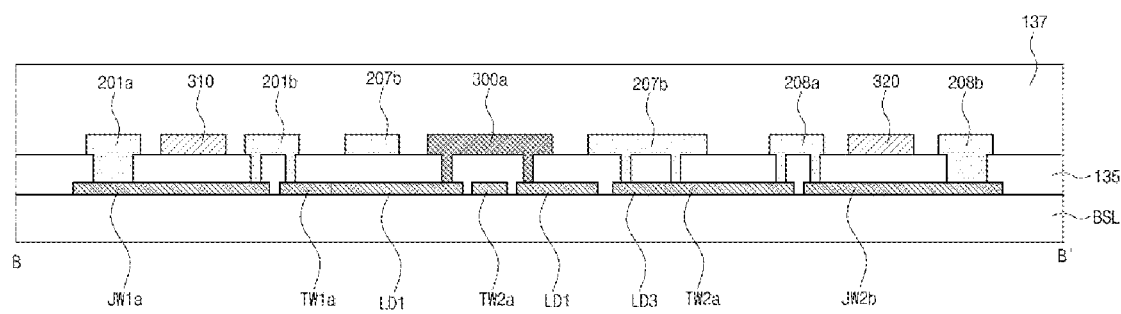

FIGS. 6A and 6B are cross-sectional views taken along a line B-B' of FIG. 5.

In FIG. 6A, the touch sensor TS (of FIG. 2) includes the plurality of driving electrodes 201*a*, 201*b*, 207*b*, 208*a* and 208*b* and the plurality of sensing electrodes 310 and 320 on a base film BSL. The base film BSL may be the encapsulating layer 130 (of FIG. 1) of the touch display device 100 (of FIG. 1) or may be a touch buffer layer over the encapsulating layer 130.

The first, seventh and eighth driving electrodes 201, 207 and 208 (of FIG. 3) are divided into the first-first and first-second driving electrodes 201*a* and 201*b*, the seventh-first and seventh-second driving electrodes 207*a* and 207*b* (of FIG. 3), and the eighth-first and eighth-second driving electrodes 208*a* and 208*b*. The plurality of driving electrodes 201*a*, 201*b*, 207*b*, 208*a* and 208*b* on the base film BSL are spaced apart from each other. The first sensing electrode 310 is disposed between the first-first and first-second driving electrodes 201*a* and 201*b* and between the seventh-first and seventh-second driving electrodes 207*a* and 207*b*, and the second sensing electrode 320 is disposed between the eighth-first and eighth-second driving electrodes 208*a* and 208*b*.

The first floating electrode 300*a* is disposed at the seventh-second driving electrodes 207*b* of the seventh driving electrode 207.

A touch insulating layer 135 is disposed on the plurality of driving electrodes 201*a*, 201*b*, 207*b*, 208*a* and 208*b*, the first and second sensing electrodes 310 and 320 and the first floating electrode 300*a*. The touch insulating layer 135 has a first-first jumping contact hole JPH1-1 exposing the first-first driving electrode 201*a*, a first-second jumping contact hole JPH1-2 exposing a first end portion of the first-second driving electrode 201*b*, a first-second bridge contact hole TPH1-2 exposing a second end portion of the first-second driving electrode 201*b*, a seventh-second bridge contact hole TPH7-2 exposing the seventh-second driving electrode 207*b*, an eighth-first bridge contact hole TPH8-1 exposing a first end portion of the eighth-first driving electrode 208*a*, an eighth-first jumping contact hole JPH8-1 exposing a second portion of the eighth-first driving electrode 208*a* and an eighth-second jumping contact hole JPH8-2 exposing the eighth-second driving electrode 208*b*.

The touch insulating layer 135 has first and second floating contact holes PPH1 and PPH2 exposing the first and second end portions of the first floating electrode 300*a*.

The first-first jumping line JW1*a* connecting first end portions of the first-first and first-second driving electrodes 201*a* and 201*b* exposed through the first-first and first-second jumping contact holes JPH1-1 and JPH1-2 is disposed on the touch insulating layer 135, and the first-first bridge line TW1*a* connecting second end portions of the first-second and second-first driving electrodes 201*b* and 202*a* exposed through the first-second bridge contact hole TPH1-2 is disposed on the touch insulating layer 135.

The second-first bridge line TW2*a* connecting first end portions of the seventh-second and eighth-first driving electrodes 207*b* and 208*a* exposed through the seventh-second and eighth-first bridge contact holes TPH7-2 and TPH8-1 is disposed on the touch insulating layer 135, and the second-second jumping line JW2*b* connecting second end portions of the eighth-first and eighth-second driving electrodes 208*a* and 208*b* exposed through the eighth-first and eighth-second jumping contact holes JPH8-1 and JPH8-2 is disposed on the touch insulating layer 135.

As a result, the first-first and first-second driving electrodes 201*a* and 201*b* are electrically connected to each other through the first-first jumping line JW1*a*, and the eighth-first and eighth-second driving electrodes 208*a* and 208*b* are electrically connected to each other through the second-second jumping line JW2*b*.

In addition, the first-second and second-first driving electrodes 201*b* and 202*a* are electrically connected to each other through the first-first bridge line TW1*a*, and the seventh-second and eighth-first driving electrodes 207*b* and 208*a* are electrically connected to each other through the second-first bridge line TW2*a*.

The first driving routing line LD1 extending from the first-first bridge line TW1*a* is disposed on the touch insulating layer 135, and the third driving routing line LD3 extending from the second-first bridge line TW2*a* is disposed at one side of the first driving routing line LD1.

A first end portion of the first driving routing line LD1 is connected to the first floating electrode 300*a* exposed through the first floating contact hole PPH1, and a second end portion of the first driving routing line LD1 is connected to the first floating electrode 300a through the second floating contact hole PPH2.

The second-first bridge line TW2a connecting the first end portions of the seventh-second and eighth-first driving electrodes 207b and 208a is disposed on the first floating electrode 300a.

Accordingly, in the touch display device 100 (of FIG. 1) according to a second embodiment of the present disclosure, the first, third and fifth driving routing lines LD1, LD3 and LD5 may be disposed between the first, seventh, thirteenth, nineteenth, twenty-fifth and thirty-first driving electrodes 201, 207, 213, 219, 225 and 231 and the second, eighth, fourteenth, twentieth, twenty-sixth and thirty-second driving electrodes 202, 208, 214, 220, 226 and 232 in the touch area TA (of FIG. 2) without electric interference.

A touch protecting layer 137 is disposed on the first-first and second-second jumping lines JW1a and JW2b, the first-first and second-first bridge lines TW1a and TW2a and the first and third driving routing lines LD1 and LD3. The touch protecting layer 137 prevents corrosion of the driving electrodes 201a, 201b, 207b, 208a and 208b, the sensing electrodes 310 and 320, the jumping lines JW1a and JW2b, the bridge lines TW1a and TW2a and the driving routing lines LD1 and LD3 due to external moisture, etc.

In FIG. 6B, the first-first and second-second jumping lines JW1a and JW2b, the first-first and second-first bridge lines TW1a and TW2a, the first and third driving routing lines LD1 and LD3 and the floating electrode 300a may be disposed on the base film BSL, the touch insulating layer 135 may be disposed on the first-first and second-second jumping lines JW1a and JW2b, the first-first and second-first bridge lines TW1a and TW2a and the first and third driving routing lines LD1 and LD3, and the first-first and first-second driving electrodes 201a and 201b, the seventh-second driving electrode 207b, the eighth-first and eighth-second driving electrodes 208a and 208b and first and second sensing electrodes 310 and 320 may be disposed on the touch insulating layer 135.

Although not shown, the second, fourth and sixth driving routing lines LD2, LD4 and LD6 and the seventh to twelfth driving routing lines LD7 to LD12 may be similarly disposed in the touch area TA (of FIG. 2) without electric interference.

Although the touch sensor TS (of FIG. 2) includes the plurality of driving electrodes 201 to 236 (of FIG. 2) and the plurality of sensing electrodes 310 to 360 (of FIG. 2) in the touch display device 100 (of FIG. 1) according to first and second embodiments of the present disclosure, a number of the plurality of driving electrodes and a number of the plurality of sensing electrodes may vary within the scope of the present disclosure.

As a result, a number and a position of the plurality of jumping lines JW1a to JW6f (of FIG. 2) and a number and a position of the plurality of bridge lines TW1a to TW6d (of FIG. 2) may vary according to a design, and a number and a position of the plurality of driving routing lines LD1 to LD12 (of FIG. 2) and a number and a position of the plurality of sensing routing lines LS1 to LS6 (of FIG. 2) may vary according to a design.

Specifically, since the touch sensors TS (of FIG. 2) according to first and second embodiments of the present disclosure has the plurality of contact holes JPH1-1, JPH1-2, JPH8-1 and JPH8-2 at the same position and the plurality of driving routing lines LD1 to LD12 (of FIG. 2) symmetrically disposed, the touch sensors TS have the same shape as each other. As a result, deterioration of a pattern may be easily detected while the touch sensor TS (of FIG. 2) is tested.

The plurality of driving electrodes 201 to 236 (of FIG. 2) and the plurality of sensing electrodes 310 to 360 (of FIG. 2) may be classified into first, second, third and fourth patterns P1, P2, P3 and P4. The first, second, third, seventh, eighth, ninth, thirteenth, fourteenth and fifteenth driving electrodes 201, 202, 203, 207, 208, 209, 213, 214 and 215 connected to each other through the first-first to third-first bridge lines TW1a to TW3a connected to the first, third and fifth driving routing lines LD1, LD3 and LD5 may be defined as the first pattern P1, and the fourth, fifth, sixth, tenth, eleventh, twelfth, sixteenth, seventeenth and eighteenth driving electrodes 204, 205, 206, 210, 211, 212, 216, 217 and 218 connected to each other through the first-third to third-third bridge lines TW1c to TW3c connected to the second, fourth and sixth driving routing lines LD2, LD4 and LD6 may be defined as the second pattern P2.

The nineteenth, twentieth, twenty-first, twenty-fifth, twenty-sixth, twenty-seventh, thirty-first, thirty-second and thirty-third driving electrodes 219, 220, 221, 225, 226, 227, 231, 232 and 233 connected to each other through the fourth-second to sixth-second bridge lines TW4b to TW6b connected to the seventh, ninth and eleventh driving routing lines LD7, LD9 and LD11 may be defined as the third pattern P3, and the twenty-second, twenty-third, twenty-fourth, twenty-eighth, twenty-ninth, thirtieth, thirty-fourth, thirty-fifth and thirty-sixth driving electrodes 222, 223, 224, 228, 229, 230, 234, 235 and 236 connected to each other through the fourth-fourth to sixth-fourth bridge lines TW4d to TW6d connected to the eighth, tenth and twelfth driving routing lines LD8, LD10 and LD12 may be defined as the fourth pattern P4.

Since the first and second patterns P1 and P2 are disposed to be symmetrical to each other and the third and fourth patterns P3 and P4 are disposed to be symmetrical to each other, deterioration of a pattern may be easily detected during a test process for the touch sensor TS (of FIG. 2).

Consequently, in the touch display device including the touch sensor according to the present disclosure, the plurality of driving electrodes are classified into the first to sixth row touch driving lines through the first to sixth bridge lines, and at least one driving routing line extends from each of the first to sixth row touch driving line. Aa a result, the number of the plurality of driving routing lines is reduced, and the plurality of driving routing lines are disposed between the plurality of driving electrodes in the touch area.

In addition, since the plurality of driving routing lines are disposed to overlap the plurality of driving electrodes, touch accuracy is improved. Specifically, since areas for the plurality of routing lines at both sides of the touch area are omitted, the touch sensor will have narrow bezel at both sides of the touch area TA.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touch display device including a touch sensor and having a touch area and a non-display area at a side of the touch area, the non-display area including a touch driving part, the touch display device comprising: a plurality of driving electrodes in the touch area, the plurality of driving electrodes connected to each other through at least one bridge line to constitute a plurality of row touch driving lines; a plurality of sensing electrodes crossing the plurality of driving electrodes in the touch area; at least one driving routing line from the at least one bridge line connecting the plurality of driving electrodes, wherein the at least one driving routing line extends from the touch area to the non-display area; wherein the plurality of driving electrodes constituting a first row touch driving line of the plurality of row touch driving lines are connected to each other through first-first and first-second bridge lines of the at least one bridge line to form a first block, wherein the plurality of driving electrodes constituting a second row touch driving line of the plurality of row touch driving lines are connected to each other through second-first and second-second bridge lines of the at least one bridge line to form a second block, wherein first and third driving routing lines of the at least one driving routing line extend from the first-first and first-second bridge lines, respectively, and second and fourth driving routing lines of the at least one driving routing line extend from the second-first and second-second bridge lines, respectively, and wherein the first and second driving routing lines are disposed to be parallel to each other, and the third and fourth driving routing lines are disposed to be parallel to each other.

2. The touch display device of claim 1, further comprising a floating electrode disposed in a crossing region of the at least one driving routing line, and
wherein the at least one driving routing line is electrically connected to the floating electrode, and the at least one bridge line is disposed on the floating electrode.

3. The touch display device of claim 1, wherein the first and second driving routing lines are connected to a first routing line, and the third and fourth driving routing lines are connected to a second routing line, and wherein the first and second routing lines are connected to the touch driving part.

4. The touch display device of claim 2, wherein the plurality of driving electrodes include a pair of driving electrodes connected to each other through a jumping line, and each of the plurality of sensing electrodes is disposed between the pair of driving electrodes.

5. The touch display device of claim 4, wherein the floating electrode is insulated from one of the pair of two driving electrodes, and another one of the pair of two driving electrodes is disposed adjacent to the floating electrode.

6. The touch display device of claim 5, wherein the floating electrode is formed in a same layer as the plurality of driving electrodes and the plurality of sensing electrodes.

7. The touch display device of claim 4, wherein the jumping line and the at least one bridge line are in a same layer as each other and are separated from the plurality of driving electrodes and the plurality of sensing electrodes with a touch insulating layer interposed therebetween.

8. The touch display device of claim 7, wherein the at least one driving routing lines is formed in a same layer as the jumping line and the at least one bridge line.

9. The touch display device of claim 4, wherein the pair of two driving electrodes and the plurality of sensing electrodes include a comb pattern protruding toward each other.

10. The touch display device of claim 4, further comprising an auxiliary jumping line spaced apart from the jumping line.

11. The touch display device of claim 1, wherein the plurality of driving electrodes constituting a first row touch driving line of the plurality of row touch driving lines are connected to each other through a first bridge line of the at least one bridge line,
wherein the plurality of driving electrodes constituting a second row touch driving line of the plurality of row touch driving lines are connected to each other through a second bridge line of the at least one bridge line,
wherein a first driving routing line of the at least one driving routing line extends from the first bridge line, and a second driving routing line of the at least one driving routing line extends from the second bridge line, and
wherein the first driving routing line and the second driving routing line are disposed to be parallel to each other.

12. The touch display device of claim 11, wherein the first driving routing line is connected to a first floating electrode in a first crossing region with the at least one bridge line, and
wherein the second driving routing line is connected to a second floating electrode in a second crossing region with the at least one bridge line and at a side of the first floating electrode.

13. The touch display device of claim 1, wherein the at least one driving routing line is disposed to overlap the plurality of driving electrodes with a touch insulating layer interposed therebetween.

14. The touch display device of claim 1, further comprising at least one auxiliary bridge line spaced apart from the at least one bridge line.

15. The touch display device of claim 1, wherein the plurality of sensing electrodes have a bar shape and cross the plurality of driving electrodes, and
wherein the plurality of sensing electrodes are connected to a plurality of sensing routing lines, and the plurality of sensing routing lines are connected to the touch driving part.

* * * * *